United States Patent [19]

Iglesias

[11] 4,249,799
[45] Feb. 10, 1981

[54] CONNECTOR FOR OPTICAL DEVICES

[75] Inventor: Jose J. Iglesias, Elizabeth, N.J.

[73] Assignee: The Iglesias Trust, Elania Iglesias, Trustee

[21] Appl. No.: 34,152

[22] Filed: Apr. 27, 1979

[51] Int. Cl.³ .................... G02B 7/00; F16D 1/10; F16B 21/06
[52] U.S. Cl. ............................ 350/257; 279/156; 279/35; 285/320; 350/251; 403/330
[58] Field of Search ............ 350/257, 251–252; 279/118–120, 156, 24, 35; 403/330, DIG. 4; 285/320

[56] References Cited

U.S. PATENT DOCUMENTS

| 850,035 | 4/1907 | Morgan | 279/119 |
| 1,591,514 | 7/1926 | Dezarn | 285/320 |
| 2,756,633 | 7/1956 | Brandes et al. | 350/252 |
| 3,070,389 | 12/1962 | Baur et al. | 350/257 |
| 4,182,558 | 1/1980 | Matsuo | 403/DIG. 4 |

Primary Examiner—Paul A. Sacher
Assistant Examiner—Wm. H. Punter
Attorney, Agent, or Firm—Scrivener, Clarke, Scrivener and Johnson

[57] ABSTRACT

The disclosure is of a device for connecting together two optical devices, and is primarily intended for quick connection and disconnection of two optical devices such as an endoscope and a viewing tube or two lenses.

1 Claim, 4 Drawing Figures

CONNECTOR FOR OPTICAL DEVICES

BACKGROUND OF THE INVENTION

The most pertinent prior art known to the inventor and those in privity with him are U.S. Pat. Nos. 1,761,157; 2,756,633; 3,822,951; 3,961,349; 4,062,030; 4,066,330 and German Pat. No. 23 46 197.

SUMMARY OF THE INVENTION

Figure 1:
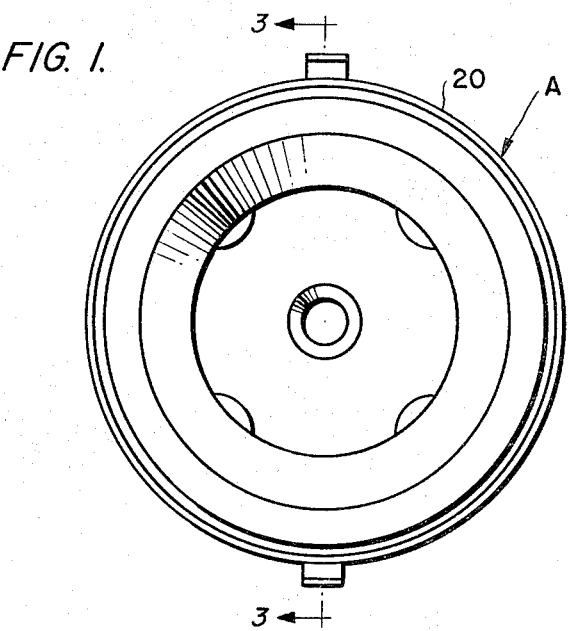
FIG. 1 is a front elevational view of the connector provided by the invention.
Figure 2:
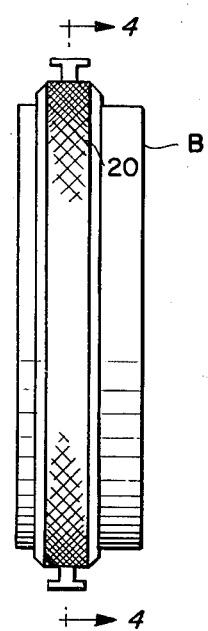
FIG. 2 is a side view of the device shown in FIG. 1.
Figure 3:
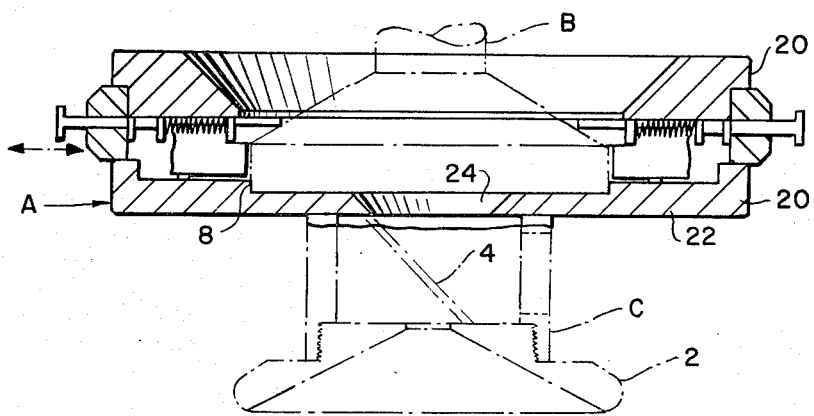
FIG. 3 is an enlarged sectional view taken on line 3—3 of FIG. 1.

The invention provides a connector for two optical devices which is provided with detent members which are operated to retracted and detent positions by levers which are in turn, operated by buttons which are externally engaged by the fingers.

DESCRIPTION OF THE INVENTION

FIGS. 1 to 4 illustrate the device provided by the invention releaseably connecting an endoscope B, such as a resectoscope, and a teaching attachment C which permits remote observation of the operative field being observed through the endoscope. The teaching attachment has an eyepiece 2, beam splitter 4, a tube leading to the remote observation eyepiece (not shown), and the connecting device A has a recess 8 within which the eyepiece of the endoscope is received.

The connector, or adaptor, comprises, first, an annular member 20 carried at the outer periphery of a circular plate 22 having a central aperture 24 which, when the device is in operative position, is concentric with the eyepieces of the endoscope and the teaching attachment. The annular member 20 has oppositely positioned openings 25, 25a therein within which are slidably received buttons 26, 28 which are of such radial length that their outer ends are always outside the periphery of the annular member 20. The inner end of each button, within the annular member 20, is provided with arms 30, 32 which are spaced apart radially of the connecting device and which are connected by member 33 and define between them oppositely positioned recesses 34, 36.

Within the annular member are four levers 40, 42, 44, 46 each of which is pivotally mounted between its ends on wall 21 of the teaching device. The inner end of each of levers 40, 42 is received within one of the recesses 34, 36 of button 26, and the inner end of each of levers 44, 46 is received within one of the recesses 34, 36 of button 28. Helical compression springs 50, 52 bear at their one ends against the inner ends of levers 40, 42 and at their other ends against fixed abutments on wall 21, and similar springs 54, 56 bear against the inner ends of levers 44, 46, whereby the inner ends of the levers and the buttons 26, 28 are constantly urged outwardly.

The outer end of each of the levers 40, 42, 44, 46 has formed on it, or permanently connected to it, a flat preferably semi-circular detent member, these being shown at 60, 62, 64, 66, which normally extend from the lever toward and a short distance into the central recess 8.

Figure 4:
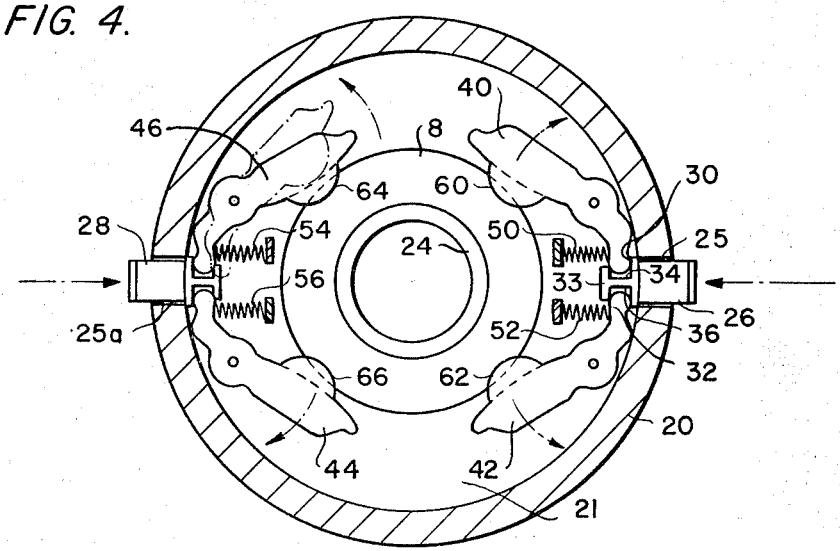
FIG. 4 is a sectional view taken on line 4—4 of FIG. 2.

When it is desired to connect two optical devices such as the eyepiece 10 of the endoscope B to the optical teaching attachment C, the buttons 26, 28 of the connector are depressed by the fingers of the user, causing the inner ends of the levers 40, 42, 44, 46 to be depressed against the springs 50, 52, 54, 56 rocking the levers and moving the detent members 60, 62, 64, 66 outwardly and out of the recess 8. This permits the eyepiece of the endoscope to be inserted into the recess 8 after which the buttons are released, permitting the springs to return the detent members to locking position as shown in FIG. 4.

While the invention has been described as applied to the connection of an endoscope to a teaching attachment, it will be understood that this is only for purpose of illustration, and that the connector is of general utility and application in the connection of any two devices, particularly but not solely in the field of optical devices. The connector device finds particular utility, for example, for the connection of two lenses.

A particular advantage of the coupler is that when in connecting relation to two optical devices it permits free relative rotation between them.

I claim:

1. A device for connecting two separate parts, particularly in the field of optics, comprising a circular plate having a central opening and an annular flange, a plurality of pairs of levers positioned internally of the flange, each of the levers being pivotally mounted on the plate at points radially outside the central opening, a detent means on the inner end of each lever, which is that most adjacent the central opening in the plate, resilient means engaging the outer end of each lever of each pair and constantly urging the levers of each pair to their positions in which the detent means are in their innermost positions, and a plurality of buttons each of which is slidably mounted in the annular flange between the outer ends of the levers of a pair of levers with their inner ends engaging the outer ends of the levers and their outer ends external to the flange for manual depression, whereby depression of the buttons will cause the detent means to move outwardly toward the annular flange.

* * * * *